March 10, 1970  W. E. BOEHRINGER ET AL  3,499,621

TORQUE LINKAGE DAMPER

Filed Sept. 6, 1967

INVENTOR.
WILFRED E. BOEHRINGER
JANE LITTLE
LOUIS T. KRAMER

AGENT

United States Patent Office 3,499,621
Patented Mar. 10, 1970

3,499,621
TORQUE LINKAGE DAMPER
Wilfred E. Boehringer, Fullerton, and Louis T. Kramer and Jane Little, Long Beach, Calif., assignors to McDonnell Douglas Corporation, a corporation of Maryland
Filed Sept. 6, 1967, Ser. No. 665,787
Int. Cl. B64c 25/50
U.S. Cl. 244—103
2 Claims

ABSTRACT OF THE DISCLOSURE

An aircraft landing gear damping mechanism which operates directly in conjunction with the landing gear torque linkage and combines the functions of a hydraulic damper and a spring type of damper.

BACKGROUND OF THE INVENTION

In the taking off and landing modes of aircraft, especially large commercial aircraft, the aircraft landing wheels are usually subjected to high speeds. In the use of the present day commercial jet aircraft, landing speeds and take-off speeds impart substantial rotational torque to each landing wheel. It has been commonly known that as wheels move over the landing surface a slight oscillation movement is created due to slight irregularities in the surface or slight changes in course of the aircraft. This type of movement commonly defined as "shimmy" has been known for several years. However, as long as aircraft speeds upon landing and take-off were maintained below a hundred and fifty miles per hour, the problem of "shimmy," though present, did not warrant corrective action. It was not until the advent of the high speed commercial jet aircraft that some means must be employed to eliminate this undesirable vibrational torque.

Even the amount of "shimmy" which occurs in the present day jet aircraft is not sufficient to cause structural damage of the aircraft. However, the "shimmy" besides being uncomfortable does require that the pilot effect a higher degree of control over the aircraft. Also, it is certain that over a relatively long period of time the vibrational torque would cause certain structural members to prematurely fail in fatigue.

Heretofore, several means have been employed for damping this undesirable torque. The simplest of all means is by the use of a weight. It has been found that if a weight of about a hundred and fifty pounds is placed at a certain location on the landing gear strut, this increase in weight through which the "shimmy" must act becomes an effective damping apparatus. However, in aircraft, the more weight that can be eliminated from the structure of the aircraft increases the load capability of the aircraft.

In another prior construction of damping apparatus a limit is placed on the turning movement of the landing wheel. Not only does such limiting of the turning movement of the wheel cause a loss of maneuverability of the aircraft, also, when the aircraft is turned beyond the turning limit, the stress that is placed upon the wheel is transmitted through the landing gear to the aircraft fuselage and may damage the fuselage structure.

In another type of damping apparatus, a frictional restricting device is employed. However, the use of a frictional device makes maneuverability of the aircraft somewhat difficult, especially in the non-tandem wheel landing gears. It is also to be noted that the tandem wheel type of landing gears do not have the acute problem of "shimmy" as do the single axle type of landing gears. It appears that the tandem type of landing gears have sufficient weight in themselves which functions to cause damping of the vibrational movements.

SUMMARY OF THE INVENTION

Applicants' invention is meant to be employed in conjunction with a landing gear of an aircraft and specifically a landing gear having a telescoping strut. It is common for the telescoped members of the landing gear strut to be connected together through a scissor type of linkage quite commonly referred to as the torque arm linkage. It is known that any undesirable vibrational torque which is transmitted from the wheels of the aircraft is passed through this torque arm linkage. It would be desirable if a damping apparatus could be associated with such linkage and prevent the transmittal of the vibrational torque from one link to another link.

As the torque arm linkage is relatively small and in close proximity to the landing wheels it was thought to be extremely difficult, if not impossible, to provide therein a damping structure. However, applicants have devised a damping structure which is to operate through the apex bolt connecting the two scissor links. The physical size of the damping apparatus has been kept quite small. The majority of the vibration energy is absorbed in the damping apparatus of applicants' invention by the use of a hydraulic damper employing a restricted orifice piston. Also, a portion of the vibration is absorbed through the use of a Belleville spring arrangement employed in conjunction with the hydraulic piston.

One of the main advantages of the damping apparatus of applicants' invention is that it is relatively small in size and light in weight. A further advantage of applicants' damping structure is that the undesirable vibrational torque is absorbed prior to transmittal to the landing gear strut. In this manner, the vibrational torque is absorbed prior to reaching the structure of the aircraft to which it can cause damage. An additional advantage of this invention is the efficiency with which the undesirable torque is damped. Also, the apparatus of this invention is simply constructed and designed so that the device will have maximum life with a minimum of maintenance. A further advantage of this invention is that by the use of springs in conjunction with a fluid damping structure a damping action over a wider range of vibrational frequencies and amplitudes is provided and also a redundancy type of damping means is available if a failure occurs in one of the damping systems.

DESCRIPTION OF THE PRESENT EMBODIMENT

Figure 1:
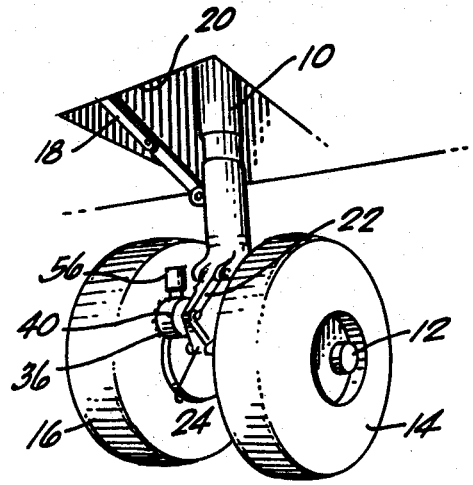
FIGURE 1 shows a pictorial view of a typical installation of the damping apparatus of this invention upon a single axle aircraft landing wheel.
Figure 2:
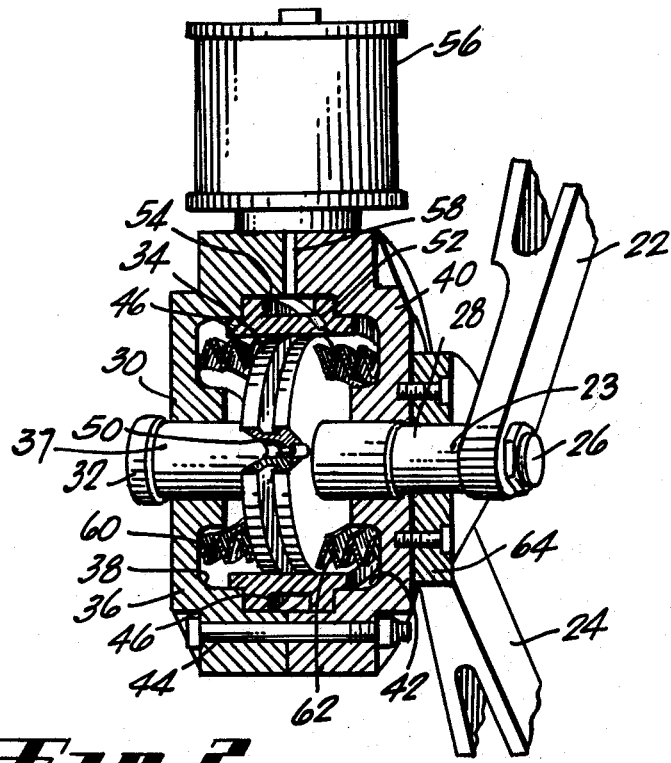
FIGURE 2 is a plan view, partially in section, of this invention showing its cooperation to the torque arm linkage arrangement of the landing wheel strut.

Referring specifically to FIGURE 1, there is shown a landing gear strut 10 of an aircraft having an axle 12 connected thereto on which are mounted landing wheels 14 and 16. Strut 10 is of the telescoping type and is hydraulically operated to collapse and fold within the aircraft fuselage by means of operating rod 18. Wheels 14 and 16 fold together within aperture 20 of the aircraft fuselage. As strut 10 is formed of two elements, one which telescopes within the other, some means must be provided to insure that the one member is maintained in alignment with the other member. The common way such alignment is provided is by means of a linkage arrangement comprised of an upper link 22 and a lower link 24. This type of linkage arrangement is quite often referred to as the scissors link. Link 22 is connected to the telescoping part of the strut which is nearest the aircraft fuselage while link 24 is connected to the portion of the strut which is connected to the axle 12. The unattached ends of the links 22 and 24 are connected together with an apex bolt 26.

Apex bolt 26 is specifically designed to function in conjunction with the apparatus of this invention. Bolt 26 is substantially extended in length and includes a recessed portion 28, a shoulder portion 30 and a terminal portion 32 which is of a larger diameter than shoulder portion 30. Permanently attached to shoulder portion 30 at about the center point thereof is an annular portion 34 which is of a substantially greater diameter. Supported upon shoulder portion 30 directly adjacent the terminal end 32 is a first housing section 36. It is to be noted that there is a slight gap 37 (about ¼ inch) between the housing section 36 and terminal end 32, the purpose of which will be explained further in the specification. Section 36 includes an annular chamber 38 therein. A second housing section 40 is supoprted on shoulder 30 on the opposite side of annular portion 34 and in mirror-like configuration to the first section 36. Second housing section 40 also includes an annular chamber therein 42. First and second housing sections 36 and 40 are connected together as by bolts 44. Annular portion 34 extends substantially the width of chambers 38 and 42 and abuts a sleeve 46. Sleeve 46 functions to connect chambers 38 and 42 into a continuous chamber unit. Annular portion 34 operates as a piston dividing chambers 38 and 42 into equal parts. Annular portion 34 has an axial passageway 48 connecting chambers 38 and 42. Passageway 48 includes a restricted orifice 50. Chambers 38 and 42 are for the purpose of confining a hydraulic fluid which is conducted into chamber 42 through passageway 52 in sleeve 46. It is to be noted that passageway 50 is of a substantially greater diameter than passageway 52. This difference in size of the passageways is necessary to cause fluid to flow from chamber 38 to chamber 42 (and vice versa) upon movement of annular portion 34.

Sleeve 46 includes an annular recess 54 which acts as an accumulator for the hydraulic fluid. A reservoir 56 is provided exteriorly of the housing unit formed by sections 36 and 40 and functions to conduct fluid to recess 54 through the passageway 58. Reservoir 56 provides the hydraulic fluid to recess 54 under pressure. The reservoir maintains the pressure within the fluid chambers 38 and 42 at approximately 50 p.s.i. This relatively high pressure is necessary for elimination of cavitation of the hydraulic fluid. Also included within chambers 38 and 42 are Belleville springs 60 and 62, respectively. Springs 60 and 62 assist in the linear vibration damping and also serve as a safety device providing some damping if the hydraulic system fails. The main purpose for springs 60 and 62 are to provide assistance if annular portion 34 is subjected to quick movements within the chambers 38 and 42.

Supported within recess portion 28 is end plate 64 which is fixedly connected to link 24 and fixedly secured to the housing section 40. It is important that the shoulder 30 be spaced from the end plate as shown in the drawing. This spacing is approximately the length of gap 37. Link 22 is attached to the apex bolt 26 which is connected to the annular piston 34. A second gap 23 is provided between links 22 and 24. The length of gap 23 is approximately the size of gap 37. In operation the device of this invention functions as follows: If a vibrational movement is generated from link 24, either the end plate 64 moves and takes up gap 23 or the housing unit is moved upon bolt 26 taking up gap 37. If a reflex movement is imparted through link 22 either link 22 moves upon bolt 26 taking up gap 23 or bolt 26 is moved taking up gap 37. In this manner movement is permitted in either direction of either link 22 or 24. This movement causes movement of the annular portion 34 within the chambers 38 and 42. In this manner the hydraulic fluid that is held therein is permitted to pass through restricted orifice 50 providing a damping action which is dependent on the flow rate established by the diameter of the orifice 50. Also, the springs 60 and 62 provide a damping action which absorbs some of the force of the movement of the annular portion 34. Clearly any movements which are generated through link 24 or link 22 are damped through the continued hydraulic-spring damping means before they can be passed through into link 22 and subsequently up into the landing gear strut structure.

While only a single embodiment of the invention has been shown herein for the purposes of illustration, it will be evident that various changes in the construction and arrangement of the parts may be resorted to without departing from the scope of this invention.

What is claimed is:

1. In combination with an aircraft type of landing gear having a main supporting strut, said strut being formed of at least a first member and a second member, said first member and said second member being telescopic with respect to each other, a linkage assembly being operatively associated with said first and second members to maintain said members in alignment, said linkage comprising at least two separate links being connected together by an apex bolt, the improvement comprising:

a vibrational damping assembly being associated with said linkage and functioning to substantially absorb the kinetic energy of vibrations transmitted from one of said separate links and preventing transmittal to the other one of said separate links, said vibrational damping assembly includes a hydraulic damper comprising a housing secured to one of said links, said housing being adapted to carry fluid in a chamber formed therein, piston means adapted to move relative to said housing within said chamber, said piston means comprising an extension of said apex bolt, said extension including an enlarged annular portion, said annular portion having a restrictive orifice for fluid passage therethrough in response to relative movement of said piston means and said housing.

2. The apparatus as defined in claim 1 wherein:

said vibrational damping assembly comprises spring means positioned in said chamber for absorbing energy resulting from relative movement of said piston means and said housing, said spring means being constantly urging said piston means to occupy a predetermined position within said chamber.

References Cited

UNITED STATES PATENTS

| | | | |
|---|---|---|---|
| 2,385,635 | 9/1945 | Maurer | 188—93 |
| 2,424,233 | 7/1947 | Greenough | 244—50 |
| 2,508,351 | 5/1950 | Bjerke | 244—103 |
| 2,866,609 | 12/1958 | Stout | 244—50 |
| 2,968,455 | 1/1961 | Smith | 244—103 |

MILTON BUCHLER, Primary Examiner

PAUL E. SAUBERER, Assistant Examiner

U.S. Cl. X.R.

188—86, 93; 244—50; 267—1